(12) United States Patent
Hagmann et al.

(10) Patent No.: US 8,601,607 B2
(45) Date of Patent: Dec. 3, 2013

(54) GENERATION OF A FREQUENCY COMB AND APPLICATIONS THEREOF

(71) Applicant: Los Alamos National Security, LLC, Los Alamos, NM (US)

(72) Inventors: Mark J. Hagmann, West Valley, UT (US); Dmitry A. Yarotski, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/625,780

(22) Filed: Sep. 24, 2012

(65) Prior Publication Data

US 2013/0212751 A1    Aug. 15, 2013

Related U.S. Application Data

(60) Provisional application No. 61/537,809, filed on Sep. 22, 2011.

(51) Int. Cl.
*G01Q 60/10*    (2010.01)
(52) U.S. Cl.
USPC ................................ 850/29; 850/26

(58) Field of Classification Search
USPC ..................................... 250/26, 29
See application file for complete search history.

(56) References Cited

U.S. PATENT DOCUMENTS 5,581,193 A * 12/1996 Weiss et al. ................ 324/76.19
5,661,301 A *  8/1997 Weiss ............................. 850/26
6,153,872 A * 11/2000 Hagmann et al. ............. 250/207

OTHER PUBLICATIONS

Hagmann, "Microwave tunneling current from the resonant interaction of an amplitude modulated laser with a scanning tunneling microscope", J. Vac. Sci. Technol. B 14, 838 (1996).*

* cited by examiner

*Primary Examiner* — Michael Logie
(74) *Attorney, Agent, or Firm* — Samuel M. Freund; Cochran Freund & Young LLC

(57) ABSTRACT

Apparatus for generating a microwave frequency comb (MFC) in the DC tunneling current of a scanning tunneling microscope (STM) by fast optical rectification, caused by nonlinearity of the DC current vs. voltage curve for the tunneling junction, of regularly-spaced, short pulses of optical radiation from a focused mode-locked, ultrafast laser, directed onto the tunneling junction, is described. Application of the MFC to high resolution dopant profiling in semiconductors is simulated. Application of the MFC to other measurements is described.

12 Claims, 6 Drawing Sheets

GENERATION OF A FREQUENCY COMB AND APPLICATIONS THEREOF

CROSS-REFERENCE TO RELATED APPLICATIONS

The present application claims the benefit of U.S. Provisional Patent Application No. 61/537,809 for "Generation of a Frequency Comb and Applications Therefor" which was filed on Sep. 22, 2011, the entire contents of which is hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to measuring properties of semiconductors and, more particularly, to generating a microwave frequency comb superimposed on the DC tunneling current of a scanning tunneling microscope for high resolution dopant profiling and other applications.

BACKGROUND OF THE INVENTION

Microwave frequency combs (MFC) have been generated using step-recovery diodes (SRD) and non-linear transmission lines (NLTL), as well as using photodetectors (PD) and other methods requiring lasers. Both SRD and NLTL are used in low-noise applications, and have measured linewidths of greater than or equal to 1 kHz. Step-Recovery Diodes have been used to generate as many as 100 harmonics at frequencies up to 50 GHz, and NLTL shows promise for applications at higher frequencies. Semiconductor photodetectors having bandwidths as high as 100 GHz are used with microwave spectrum analyzers to characterize ultrafast lasers, and photodetectors are also used in low-noise applications, frequently mounted on an antenna where they are referred to as "photoconductive antennas". Other methods for generating microwave frequency combs that require lasers include optoelectronic feedback by injecting the optical pulses to a slave laser, and coupling the detected microwave output to a microwave synthesizer for negative feedback. Typically the line widths are also greater than or equal to 1 kHz for these laser methods.

The fractional linewidth of the peak in a signal, defined as the full-width at half height divided by the center frequency for the oscillator generating the signal, is equal to the reciprocal of the quality factor or Q of the oscillator. The highest reported quality factors are approximately $10^9$ at a single frequency between 10 GHz and 20 GHz generated using cryogenic quartz bulk acoustic wave resonators or cryogenic sapphire oscillators.

Microwave energy has been coupled into and/or out of tunneling junctions in scanning tunneling microscopes (STM) using separate coaxial cables connected to the tip and sample electrodes of the STM, or by using a coil in close proximity to the tunneling junction. These methods provide adequate coupling at frequencies up to several GHz, but the coupling region is significantly larger than the tunneling junction which increases the noise.

Scanning capacitance microscopy (SCM) has been used for nanoscale dopant profiling in semiconductors, where fringing capacitance and stray capacitance constitute the bulk of the measured capacitance, and capacitance of the depletion region in the semiconductor sample to be measured, represents about 1 part per million of the total capacitance. Thus, small changes in the total capacitance must be determined using a resonant circuit. Tip electrodes having radii of curvature less than 10 nm are difficult to fabricate; therefore, 10 nm is presently a lower limit for resolution in measurements that are performed using SCM.

SUMMARY OF THE INVENTION

Accordingly, it is an object of embodiments of the present invention to provide an apparatus and method for generating a microwave frequency comb having spectral features with sub-Hertz linewidths.

Another object of embodiments of the present invention is to provide an apparatus and method for determining the nanoscale dopant profile of semiconductors.

Yet another object of embodiments of the present invention is to provide an apparatus and method for determining the nanoscale dopant profile of semiconductors, using a microwave frequency comb.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for generating a microwave frequency comb, hereof, includes: a scanning tunneling microscope including: control electronics; a source for generating a bias voltage; and a tunneling junction having a chosen diameter and a DC current generated from the bias voltage, the tunneling junction being effective for producing optical rectification; and a mode-locked laser having a pulsed output having a mean photon energy focused onto the tunneling junction with a chosen repetition rate; whereby pulses having a chosen spacing are superimposed on the DC current of the tunneling junction such that the microwave frequency comb is produced having a fundamental frequency (first harmonic) equal to the pulse repetition rate of the laser, and additional harmonics at integer multiples of the fundamental, each harmonic having a linewidth.

In another aspect of the present invention and in accordance with its objects and purposes, the apparatus for characterizing a semiconductor sample, hereof, includes: a scanning tunneling microscope including: control electronics; a source for generating a DC bias voltage; a tunneling junction having a chosen diameter and a DC current generated from the DC bias voltage, the tunneling junction being effective for producing optical rectification, the tunneling junction comprising a tip electrode and a semiconductor sample electrode having a surface disposed a chosen distance therefrom and a band gap energy; and a scanner for adjusting the chosen distance and for rastering the tunneling junction over the surface of the semiconductor electrode; and a mode-locked laser having a pulsed output having a chosen mean photon energy less than the band gap energy focused onto the tunneling junction with a chosen repetition rate; whereby pulses having a chosen spacing are superimposed on the DC current of the tunneling junction such that a microwave frequency comb is produced having a fundamental frequency (first harmonic) equal to the pulse repetition rate of the laser, and additional harmonics at integer multiples of the fundamental; and whereby the bias voltage creates a depletion region in the semiconductor sample causing thereby a frequency-dependent attenuation of the microwave frequency comb at each tunneling junction location, from which dopant concentration of the depletion region is determined.

Benefits and advantages of the present invention include, but are not limited to, the generation of a microwave frequency comb wherein each of the frequencies in the comb have sub-Hz linewidths, and the accuracy at which the dopant concentration of a depletion region is measured is substantially improved using 50 or more harmonics of the comb.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
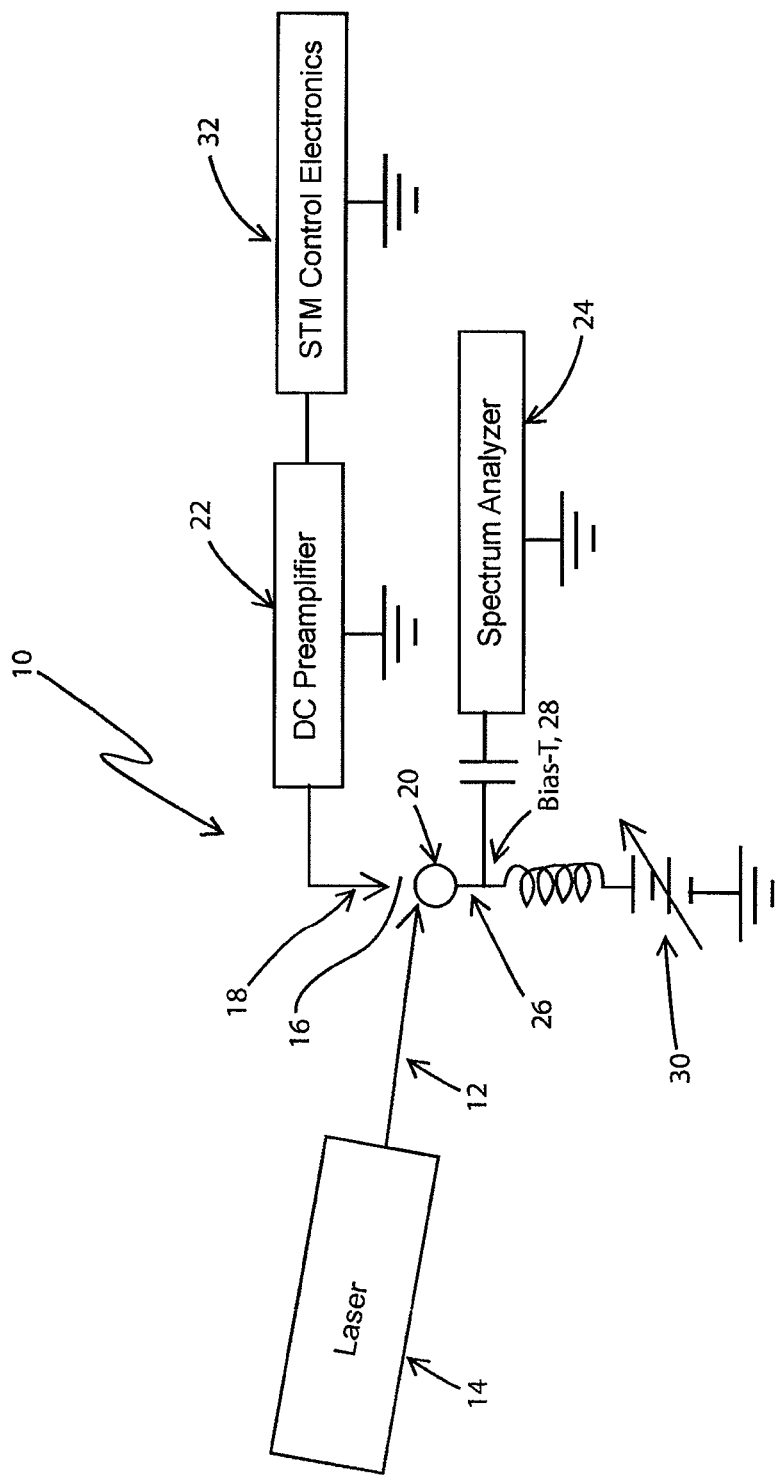
FIG. 1 is a block diagram of an embodiment of the apparatus, showing a passively mode-locked laser used to generate the microwave frequency comb in an STM in accordance with the teachings of the present invention.

Briefly, embodiments of the present apparatus and method include the generation of a microwave frequency comb (MFC) superimposed on the DC tunneling current of a scanning tunneling microscope (STM) by fast optical rectification, caused by nonlinearity of the DC current vs. voltage curve for the tunneling junction, of regularly-spaced, short pulses of optical radiation from a focused mode-locked, ultrafast laser, directed onto the tunneling junction. That is, a regular sequence of short pulses in the tunneling current caused by short pulses of electric field at optical frequencies incident on a tunneling junction in the frequency domain, is a microwave frequency comb having harmonics that are integer multiples of the pulse repetition frequency of the mode-locked laser. Generating a MFC in a STM has the potential for better characterization of samples, for example, for high resolution dopant profiling in semiconductors, and tunneling junction properties, because measurements may be performed at a large number of harmonics.

In addition to the measurement of dopant densities in semiconductors, the frequency comb in a STM may be used for other applications. The large number of measurable harmonics having exceptionally narrow linewidths makes this technique applicable for time and frequency metrology at nanoscale dimensions. For such measurements, the laser is stabilized to minimize the drift in the pulse repetition frequency. Applications include measuring the frequency response and noise spectrum of nanoscale electronic devices such as single-electron transistors, ballistic deflection transistors, carbon nanotube field effect transistors, and other devices made using carbon nanotubes. Nanoscale passive devices, such as impedance transformers, capacitors, and branch junctions, might also be characterized. Complete microwave receivers have been fabricated by CMOS with 65-nm lithography for Doppler measurements and other applications, and MFC might be used to calibrate these and other circuits. Additional applications of MFC to fundamental physics may include high-frequency measurements of the S-parameters of carbon nanotubes, probing the plasmon dynamics of metallic nanoparticles to determine the ultrafast dynamics for collective electron excitations, and means for probing the electronic response of nanostructures.

Other devices having tunneling junctions may also be used as a source for the MFC. Small physical sizes are chosen for high-speed electronic components, including ultrafast photodetector diodes, to reduce the effects of parasitic resistance, capacitance, and inductance. For example, for STMs, increasing the radius of the tunneling junction by a factor of $\alpha$ would increase the shunting capacitance of the junction by a factor of $\alpha^2$, thereby reducing the frequency of the maximum detected harmonic in the frequency comb by $\alpha^2$. Thus, if a device other than a STM is used, it is anticipated that tunneling junctions having a radius 1 nm would have similar high-frequency performance. In addition to simple, single-axis piezoelectric-controlled gaps, such devices might include mechanically controlled break junctions, squeezable tunneling junctions, mercury tunneling junctions, electrolytic tunneling junctions, or self-assembled tunneling junctions.

If it is not necessary to make measurements at nanoscale dimensions, other applications of non-STM systems, include coupling the harmonics of the MFC to instruments for time and frequency metrology, where a large number of measurable harmonics having exceptionally narrow linewidth is required. Again, a passively or actively stabilized mode-locked laser may be used to minimize the drift in the pulse repetition frequency for such measurements.

The dependence of the DC tunneling current $I_0$ on the applied bias $V_0$ in a STM may be approximated by $I_0 = AV_0 + BV_0^2 + CV_0^3$. Because of the non-linear terms B and C, a time-dependent voltage superimposed on the DC bias causes a rectified current as well as harmonics in the tunneling current if the time-dependent voltage is a sinusoid. In particular, laser radiation focused on the tunneling junction causes a rectified current, and a regular train of optical pulses from a mode-locked ultrafast laser generates a regular train of pulses in the tunneling current. Fourier analysis shows that if $T \gg \tau$, where T is the spacing between sequential pulses and $\tau$ is the duration of each pulse, the tunneling current will contain a frequency comb consisting of harmonics at frequencies which are integer multiples of 1/T, the pulse repetition frequency.

Equations (1) and (2), below, give the power in the nth harmonic, which has a frequency equal to n/T, and the total power for all of the harmonics, respectively, that would be delivered to a load having resistance R which is located within the tunneling junction. These two equations were derived by the present inventors (See, e.g., Microwave Frequency-Comb Generation in a Tunneling Junction by Intermode Mixing of Ultrafast Laser Pulses," by Mark J. Hagmann et al., Appl. Phys. Letts. 99, 011112 (2011), the entire contents of which is hereby specifically incorporated by reference herein for all that it discloses and teaches.) using a semi-classical approximation in which optical rectification of the laser radiation was evaluated assuming the same form for the current-voltage relation as for the DC case because of quasistatic conditions in the tunneling junction. Here S is the power flux density of the laser, s is the length of the tunneling junction, $\eta$ is the impedance of free space, and $\alpha$ is a dimensionless constant less than 1 describing the shape of the STM tip. Each optical pulse is assumed to have a Gaussian envelope $\exp[-(t/\tau)^2]$. The gain factor G (in dB) includes intensification of the laser radiation by the "antenna effect" of the tip electrode, as well as a first-order correction for the adiabatic approximation by introducing a resonance-caused by virtual photon processes.

$$P_n = \frac{\pi}{4} I_0^2 R \left[ \frac{BV_0^2 + 3CV_0^3}{AV_0 + BV_0^2 + CV_0^3} \right]^2 \left( \frac{10^{\frac{G}{10}} \alpha^2 \eta s^2 S}{V_0^2} \right)^2 \left( \frac{\tau}{T} \right)^2 \exp\left[-n^2 \pi^2 \left(\frac{\tau}{T}\right)^2\right] \quad (1)$$

$$P_T = \frac{\sqrt{\pi}}{8} I_0^2 R \left[ \frac{BV_0^2 + 3CV_0^3}{AV_0 + BV_0^2 + CV_0^3} \right]^2 \left( \frac{10^{\frac{G}{10}} \alpha^2 \eta s^2 S}{V_0^2} \right)^2 \left( \frac{\tau}{T} \right) \quad (2)$$

The exponential term in Eq. (1) shows that there is no significant decay in the amplitude of successive harmonics until frequencies that are comparable with $1/\tau$ if the load were located within the tunneling junction. For example, with $\tau=15$ fs and a pulse repetition frequency of 74.25 MHz, the power in the harmonic at 742.5 GHz ($n=10^4$) would be 99.88% of the power in the fundamental ($n=1$). For comparison, Eq. (1) shows that if $\tau=150$ fs or 1500 fs, the power would be 99.88% of the power in the fundamental at 74.25 GHz ($n=1000$) and 7.425 GHz ($n=100$), respectively. However, Eq. (1) also shows that for each of the lower harmonics, where the exponential term has a value of approximately unity, the power with $\tau=150$ fs or 1500 fs will be 100 or 10,000 times that with $\tau=15$ fs, respectively. Since optical rectification is the mechanism for generating the microwave frequency comb, the optical frequency of the laser does not have a significant effect on the power of the harmonics which have frequencies that are less than 10% of the optical frequency, but measurements made in any circuit which is connected to the tunneling junction are limited by that circuit.

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 1, a block diagram of an embodiment of apparatus, 10, used to generate the microwave frequency comb in an STM in accordance with the teachings of the present invention, is shown. A 15-fs pulse train, 12, from a Kerr-lens, passively mode-locked Ti:sapphire laser, 14, (CompactPro, Femtolasers) was focused on tunneling junction, 16, of a commercial STM (UHV300, RHK Technology), not shown in FIG. 1, which was operated in air. Freshly etched tungsten tips, 18, were annealed shortly before each measurement to temporarily remove all water and oxide layers. Samples, 20, were small (<1 mm in diameter) gold or platinum-iridium (Pt—Ir) alloy beads formed in a hydrogen flame. The current from the tunneling junction, 16, is a superposition of a DC tunneling current and the microwave frequency comb. Sample 20 is connected to a bias-T, 28, by a section of miniature coaxial cable, 26, and the bias-T separates the two components of the current. Thus, the frequency comb is routed to the spectrum analyzer (RSA-6120A, Tektronix combined with a low-noise preamplifier (AFS42 series, Mitek), not shown in FIG. 1, or PXA-N9030A, Agilent), and the DC current is routed to STM bias supply, 30. Alternatively, a microwave receiver or other type of detector may be used, or there may be a means for coupling the microwave frequency comb as an input to other apparatus, such as bias-T 28, because this signal may be used for time and frequency metrology. Tip 18 is connected to the DC preamplifier (SR 570 series, Stanford Research Systems), which amplifies the DC tunneling current and acts as a short at high-frequencies to complete the circuit for the microwave frequency comb. Scanning tunneling microscope control electronics, 32, are used to adjust the tip-sample distance to maintain the specified DC tunneling current and, in the EXAMPLE described hereinbelow to move tip 18 over sample 20 in a chosen pattern (rastering) to make measurements thereon. Alternatively, bias-T 28 may be placed in the circuit of tip 18 between tip 18 and DC preamplifier 22, instead of between sample 20 and bias supply 30.

Figure 2:
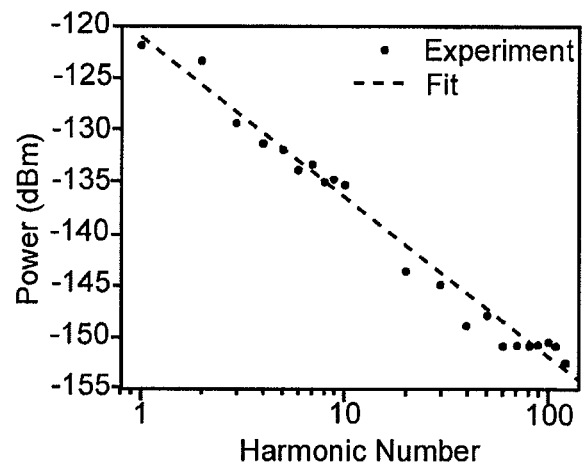
FIG. 2 is a graph of the measured mean power $\pm\sigma$ in dBm as a function of harmonic number for 21 harmonics of the microwave frequency comb.

Spectrum analyzer 24 was used in the Fast Fourier Transform (FFT) mode to measure the power in 21 harmonics of the microwave frequency comb, spanning from the first at approximately 74.254 MHz, to the 120th harmonic at 8.910 GHz. The DC tunneling current was 100 μA with an applied bias 30 of 1.0 V. FIG. 2 is a graph of the mean value for the power in dBm as a function of harmonic number for each harmonic with error bars representing the mean plus or minus one standard deviation, ±σ, for N=6 measurements. There is also a least-squares regression analysis (dashed line) showing that the power at the nth harmonic, $P_n$, may be approximated by $$P_n = \frac{A}{1 + (BF_n)^2} \quad (3)$$

where $f_n$ is the frequency of the harmonic and A and B are fitting parameters. The empirical value of parameter B is consistent with an equivalent circuit including an ideal current source within the tunneling junction that has no frequency dependence connected in parallel with a shunting capacitance of 6.4 pF (stray capacitance in the sample holder), and a resistive load of 50Ω to represent the spectrum analyzer. These data are consistent with theoretical prediction that the principal cause of decay in the amplitude of successive harmonics is due to limitations of the measurement circuit.

Figure 3:
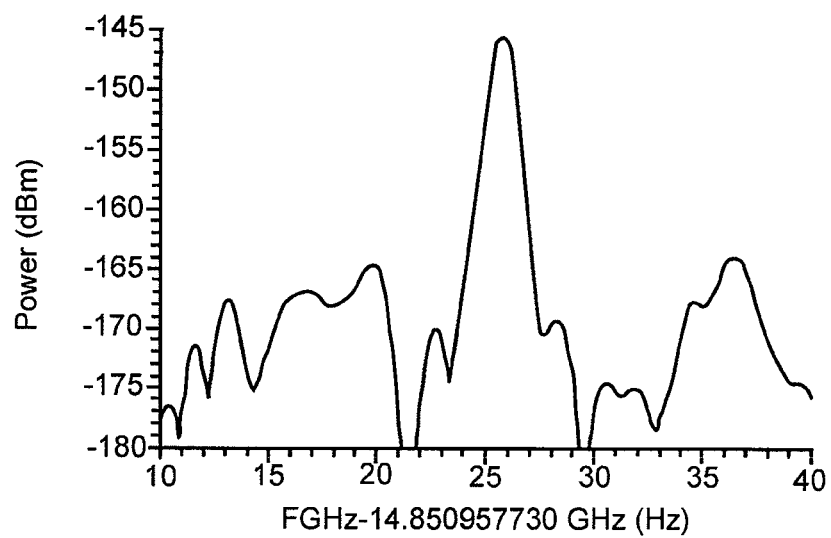
FIG. 3 is graph of the power in dBm in the $200^{th}$ harmonic of the microwave frequency comb at 14.85 GHz, as a function of frequency.
Figure 4:
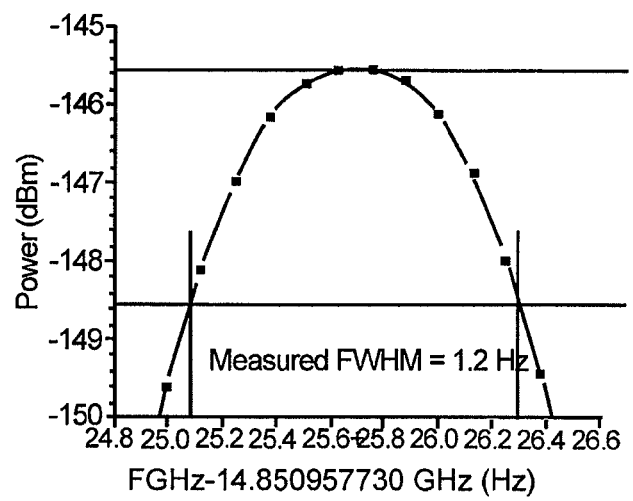
FIG. 4 is an expanded graph of the power in dBm of the $200^{th}$ harmonic of the microwave frequency comb at 14.85 GHz, over that in FIG. 3 hereof.

Spectrum analyzer 24 was also used to make measurements at several of the higher harmonics of the microwave frequency comb using a DC tunneling current of 10 μA with an applied bias of 1.0 V. FIGS. 3 and 4 illustrate the spectrum of the 200th harmonic of the microwave frequency comb, which has a center frequency of approximately 14.85 GHz. A frequency offset was used for the abscissa in these two FIGURES because of the extremely narrow linewidth. FIG. 3 shows that the peak power is 2.8 atto-Watts (2.8×10$^{-18}$ Watts) with a signal-to-noise ratio of 20 dB. FIG. 4 shows a part of the measured spectrum for the 200$^{th}$ harmonic, which suggests that the linewidth, defined as the full-width-at-half-maximum (FWHM), is 1.2 Hz, while measurements of other harmonics showed a FWHM of 1.18 to 1.22 Hz. However, a lower limit for the measured linewidth is set by the resolution bandwidth of 1 Hz for the spectrum analyzer, as well as spectral broadening from phase noise in the local oscillators of the instrument. It is therefore likely that the actual linewidth is less than 1.0 Hz for all of the measured harmonics. In order to generate signals having fractional linewidths comparable to the measurements of the 200$^{th}$ harmonic (1 Hz/14.84 GHz=6.7×10$^{-11}$) it would be necessary for the oscillators employed to have a quality factor (Q) greater than the reciprocal, or 1.5×10$^{10}$, which exceeds the highest previously reported values of about 10$^9$ for cryogenic quartz bulk acoustic wave resonators and cryogenic sapphire oscillators.

In applications which do not require the STM, Spectrum Analyzer 24 in FIG. 1 may be replaced by other instruments in which the MFC is used for time and frequency metrology. In single-axis piezoelectric-controlled gaps, mechanically controlled break junctions, squeezable tunneling junctions, mercury tunneling junctions, electrolytic tunneling junctions, self-assembled tunneling junctions or tunneling junctions of other types of tunneling junctions STM Control Electronics 32 in FIG. 1 would be replaced by other types of control electronics, which are well known to those having skill in the art, for maintaining a constant DC tunneling current.

Figure 5:
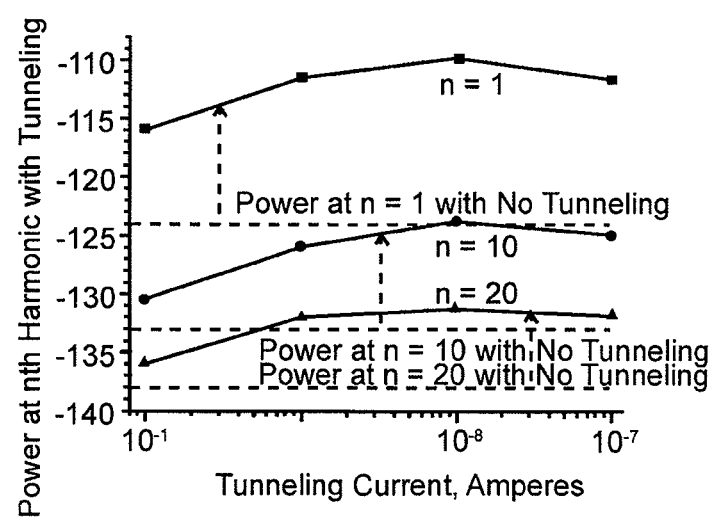
FIG. 5 is a graph of the power at the fundamental, $10^{th}$ and $20^{th}$ harmonics in the frequency comb generated using a silicon sample in and out of the tunneling regime.

Apparatus 10 of FIG. 1 has also been used to make measurements of the microwave frequency comb using silicon sample 20 in place of the metal bead, wherein Ti:Sapphire laser 14 generates electron-hole pairs in the silicon, because the mean photon energy of 1.55 eV exceeds the band gap energy of 1.12 eV in the semiconductor. Generation of terahertz radiation has been reported by focusing light from an ultrafast laser on the surface of a semiconductor to create electron-hole pairs, because these particles rapidly move in the built-in static field of the semiconductor to create surge currents that produce the radiation. By using mode-locked Ti:Sapphire laser 14 and silicon sample 20 in a scanning tunneling microscope, a superposition of two microwave frequency combs is measured: one from optical rectification of the laser radiation within the tunneling junction, and the second comb from the surge currents. The harmonics in both of these combs have the same set of frequencies, as integer multiples of the pulse repetition frequency of the mode-locked laser. FIG. 5 shows measurements that were made in air using four DC tunneling currents of 100 pA, 1 nA, 10 nA, and 100 nA, with a DC bias of 1.5 V, as well as measurements out of the tunneling mode (zero measured DC current) when the harmonics are only generated by the surge currents. For each of 3 harmonics in the microwave frequency comb (n=1, 10, and 20), there is a dashed horizontal line representing the power measured when out of the tunneling mode, a set of 4 data points connected with solid lines to represent the power measured at 4 different values of the DC tunneling current, and a dashed vertical arrow connecting the dashed horizontal line to the corresponding solid line. For each harmonic, the set of 4 data points for measurements in the tunneling mode are above the corresponding solid line. Thus, FIG. 5 shows that a DC tunneling current as low as 100 pA causes a measurable increase in the power at each of the harmonics. The decreased power at successive harmonics is attributed to the apparatus used for coupling the current from the tunneling junction, because the surge currents are not expected to decrease until terahertz frequencies.

To avoid creating electron-hole pairs in the semiconductor, which cause the above-described surge currents which interfere with the present frequency comb measurements for dopant profiling, mode-locked ultrafast lasers in which the mean photon energy is less than the bandgap energy of the semiconductor being tested are used. The TABLE lists 30 semiconductors with their band gaps, and 9 ultrafast lasers with the photon energy corresponding to each center wavelength. Each laser could be used with the semiconductors that are listed above it without creating electron-hole pairs, unless extremely high intensities were used, thereby causing two-photon absorption.

TABLE

| Semiconductor | Band gap eV | Ultrafast Laser | $\lambda_{center}$ nm | Photon eV |
|---|---|---|---|---|
| Diamond | 5.47 | | | |
| ZnS | 3.60 | | | |
| GaN | 3.44 | | | |
| ZnO | 3.37 | | | |
| SiC | 2.87 | | | |
| ZnSe | 2.70 | | | |
| AlP | 2.45 | | | |
| CdS | 2.42 | | | |
| GaP | 2.24 | | | |
| ZnTe | 2.24 | | | |
| AlAs | 2.18 | | | |
| BP | 2.00 | | | |
| | | CPM Dye [1] | 625 | 1.98 |
| Se | 1.74 | | | |
| CdSe | 1.73 | | | |
| MoS$_2$ | 1.70 | | | |
| AlSb | 1.62 | | | |
| | | Ti:sapphire [8] | 800 | 1.55 |
| Bas | 1.50 | | | |
| CdTe | 1.47 | | | |
| | | Cr:LiSAF [2] | 855 | 1.45 |
| GaAs | 1.42 | | | |
| InP | 1.34 | | | |
| | | Yb:YAG [3] | 1040 | 1.19 |
| | | Nd:YAG [3] | 1064 | 1.16 |
| Si | 1.12 | | | |
| | | Cr:Forsterite [4] | 1250 | 0.992 |
| FeS$_2$ | 0.95 | | | |
| | | Cr:YAG [5] | 1450 | 0.855 |
| | | Er/Yb fiber [6] | 1560 | 0.795 |
| InN | 0.70 | | | |
| GaSb | 0.67 | | | |
| Ge | 0.67 | | | |
| | | Cr:ZnSe [7] | 2470 | 0.502 |
| PbS | 0.37 | | | |
| InAs | 0.36 | | | |
| PbTe | 0.29 | | | |
| PbSe | 0.27 | | | |
| InSb | 0.17 | | | |

Having generally described the invention, the following EXAMPLE provides additional details:

EXAMPLE

In the following EXAMPLE, the microwave frequency comb is used measure the nanoscale dopant profile of semiconductors:

A negative or positive DC bias voltage applied to the tip electrode of a STM causes a depletion layer at the surface of an n-type or p-type semiconductor sample, respectively. In what follows, n-type semiconductors will be described, but the application to p-type semiconductors is straight forward to one having skill in the semiconductor art.

Figure 6:
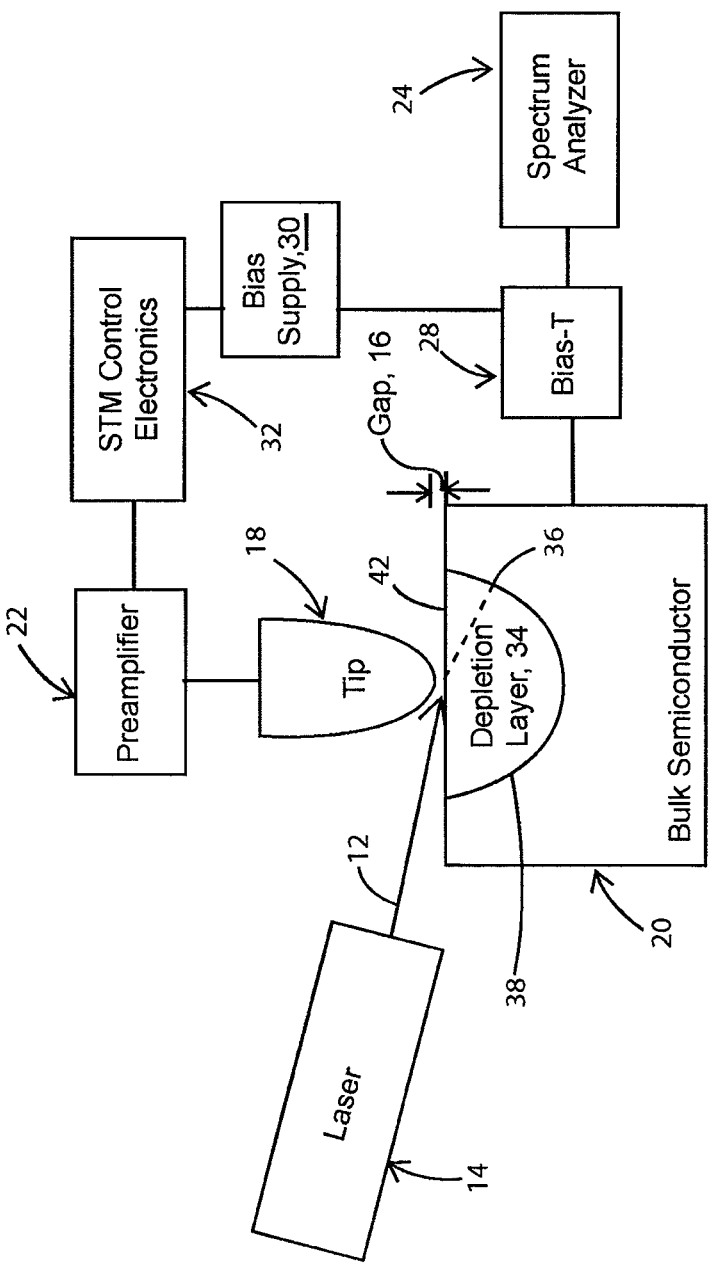
FIG. 6 is a schematic representation of a microwave frequency comb generated in a semiconductor sample in an STM using a passively mode-locked laser, and illustrating the carrier depletion layer.

The close proximity of tip 18 to semiconductor sample 20 causes depletion layer, 34, to have an approximately hemispherical shape as shown in FIG. 6. As the DC bias is made more negative, radius, 36, of the depletion layer increases, as a function of the density of major carriers at outer surface, 38, of the hemisphere. Thus, if the capacitance of the depletion layer is determined as a function of the applied DC bias, the average density of major carriers at each hemispherical surface may be calculated, from which the density of dopant ions may be calculated. Radiation from mode-locked ultrafast laser 14 is focused on the tunneling junction between the surface of tip 18 and surface, 42, of semiconductor 20 forming gap, 16, creating a microwave frequency comb, as described hereinabove. In each pulse of the tunneling current, tunneling electrons fill empty states at a small spot on surface 42 of sample 20, which causes a displacement current in the depletion capacitance. Subsequently, the built-in static field of the depletion layer causes the electrons to transit to the bulk region to discharge the depletion capacitance, which is a much slower process.

Figure 7:
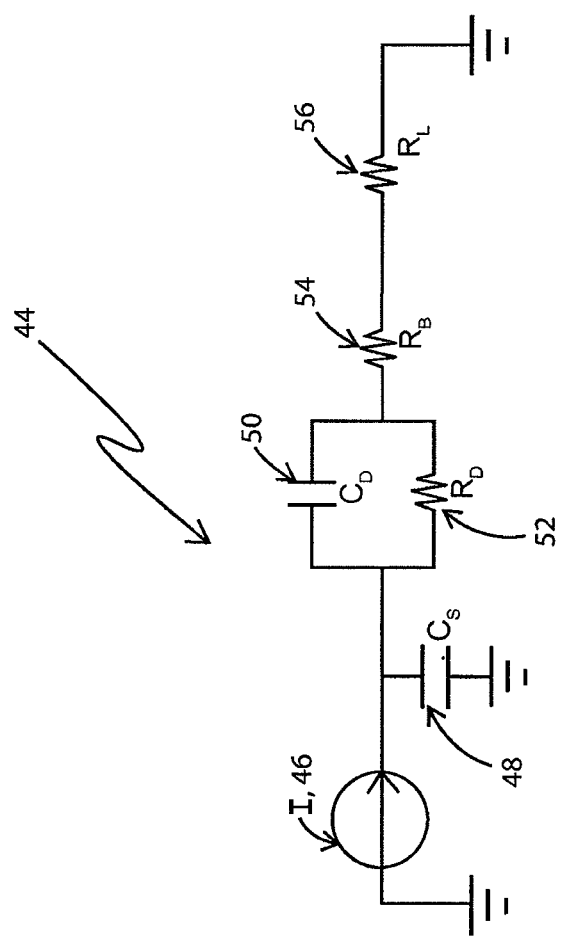
FIG. 7 illustrates an equivalent circuit for dopant profiling using the microwave frequency comb of the present invention.

FIG. 7 shows equivalent circuit, 44, for the analysis of dopant profiling of semiconductors with the microwave frequency comb. Radiation 12 from mode-locked ultrafast laser 14 is not explicitly included in the equivalent circuit; however, ideal current source I, 46, represents the pulses of tunneling current in the time domain, which correspond to the harmonics of the microwave frequency comb in the frequency domain. Here $C_S$, 48, is the shunting capacitance, $C_D$, 50, and $R_D$, 52, represent the resistance and capacitance of the depletion layer, respectively, $R_B$, 54, is the resistance of the bulk semiconductor, and $R_L$, 56, is the resistance of the spectrum analyzer. The capacitance and resistance of the depletion layer act as series circuit elements, and thus the impedance of the depletion layer causes a frequency-dependent attenuation of the individual harmonics of the microwave frequency comb. FIG. 7 illustrates that the current I is divided between two loops of the circuit; a part passing through shunting capacitance 48, and the remainder of the current passing through depletion layer 50 and 52, bulk semiconductor 54, and spectrum analyzer 56. At successively higher harmonics, because the frequency is greater, the reactance of both capacitors is decreased, thus reducing the impedance of both loops of the circuit. However the resistances of depletion layer 50, bulk semiconductor 54, and the spectrum analyzer 56 cause the change in the impedance to be less for the loop containing spectrum analyzer 56. Thus, at successively higher harmonics the power measured with the spectrum analyzer is decreased.

Figure 8:
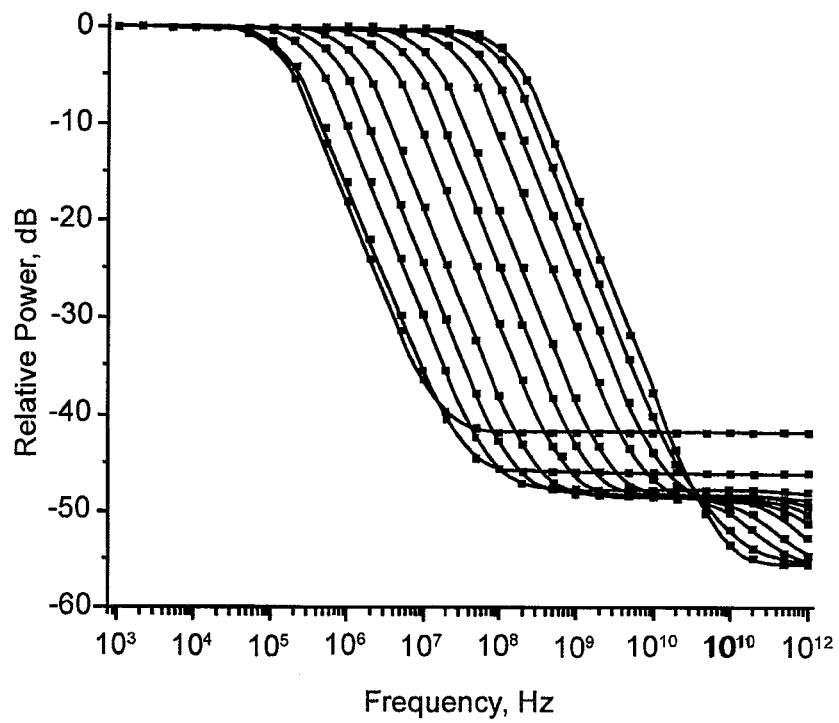
FIG. 8 shows simulated values of the relative power in dB delivered to the load as a function of the frequency of each harmonic for dopant concentrations from $2 \times 10^{15}$ to $10^{19}$ atoms per cm$^3$ (upper to lower curves).
Figure 9:
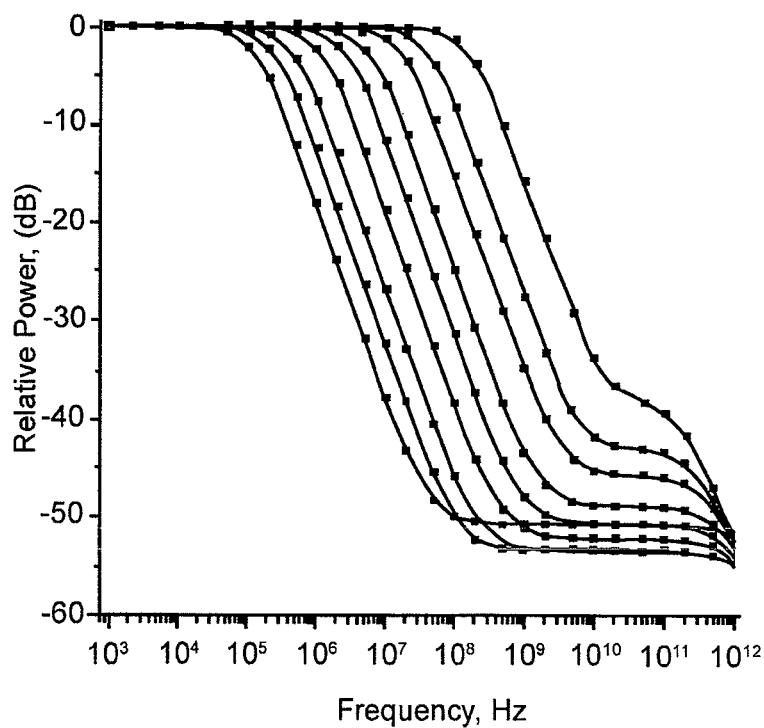
FIG. 9 shows simulated values of the relative power in dB delivered to the load as a function of the frequency of each harmonic for depletion layers having thicknesses from 1 nm to 30 nm (upper to lower curves).

FIGS. 8 and 9 show the results of simulations of the relative power measured by the spectrum analyzer as a function of the frequencies of the harmonics in nanoscale dopant profiling using the microwave frequency comb. The radius of the spot for the empty states that are filled by the tunneling electrons is 10 nm, load resistance 56 is 50Ω, and the DC tunneling current is 1 nA. The calculations were made for silicon having a relative permittivity of 11.0, with a hemisphere for the outer surface of the sample. The values of the resistances $R_D$ 52 and $R_B$ 54 were determined consistently using empirical equations for the mobility of the semiconductor with the depth of the depletion region 36 as a function of the applied DC bias. The model does not include the processes within the tunneling junction that create the current at each harmonic, but only considers the relative power that is delivered to the load for a specific value of the current.

FIG. 8 shows the relative power measured by the spectrum analyzer as a function of the frequencies of the harmonics for dopant concentrations: $2 \times 10^{15}$, $5 \times 10^{15}$, $10^{16}$, $2 \times 10^{16}$, $5 \times 10^{16}$, $10^{17}$, $2 \times 10^{17}$, $5 \times 10^{17}$, $10^{18}$, $2 \times 10^{18}$, $5 \times 10^{18}$ and $10^{19}$ atoms per cubic centimeter, from the upper curve to the lower curve, respectively. FIG. 8 illustrates that over a wide range of dopant concentrations N, for each value of N the power varies inversely with the square of the frequency in a band of frequencies from $f_{min}$ to $f_{max}$ where the ratio $f_{max}/f_{min}$ is approximately 100. Further, the values of $f_{min}$ and $f_{max}$ depend on N, so that at a specific frequency the power drops by 6 dB when the dopant concentration is increased by a factor of 2, yielding high sensitivity to the dopant concentration.

FIG. 9 shows the relative power measured by the spectrum analyzer as a function of the frequencies of the harmonics as the DC bias is varied to change the depth of the depletion layer for depths of 1, 2, 3, 5, 7, 10, 15, 20, and 30 nm, from the upper curve to the lower curve, respectively. The dopant concentration is $10^{17}$ atoms per cubic centimeter. FIG. 9 illustrates that for a wide range of depths for the depletion layer, the power varies inversely with the square of the frequency in a band of frequencies from $f_{min}$ to $f_{max}$ where the ratio $f_{max}/f_{min}$ is approximately 100. Further, the is values of $f_{min}$ and $f_{max}$ depend on the depth of the depletion layer, so that at a specific frequency the output power drops as the depth is increased. For example, the power drops by 23 dB when the depth is changed from 1 to 2 nm; by 7 dB when it is changed from 15 to 17 nm, and by 5 dB when it is changed from 30 to 40 nm. These results suggest that the output power is sensitive to the depth of the depletion layer.

In dopant profiling with the microwave frequency comb of embodiments of the present invention, tip electrode 18 is scanned over surface 42 of sample 20, and at each point on the sample the following procedure is followed:

(1) The bias voltage applied to the tip in the STM is chosen to create an approximately hemispherical depletion region near the surface of the semiconductor, having a radius that is controlled by the value of the DC bias;

(2) A mode-locked ultrafast laser is focused on the tunneling junction to cause a regular sequence of short pulses in the tunneling current; and (3) At each of the chosen values for the bias voltage, the attenuation of the harmonics in the microwave frequency comb is measured to characterize the depletion layer as shown in FIGS. 8 and 9. The simulations for these two FIGURES were made assuming homogeneous doping, but using the relative power measured in the microwave comb with different values of the applied bias, it is possible to determine the dopant concentration as a function of depth at each point in the scan over the surface.

The present procedure may be compared with dopant profiling using Scanning Capacitance Microscopy (SCM) as follows:

(1) The "oscillator" for measuring the capacitance using embodiments of the present invention is at nanoscale dimensions—the tunneling junction, whereas in the SCM the oscillator is a circuit which has appreciable radiation and capacitive coupling to the rest of the SCM;

(2) The "point of contact" is the tunneling junction, with a radius of atomic size ≤1 nm instead of a metal tip having fringing fields, which permits considerably finer resolution than is possible with the SCM;

(3) The depletion layer forms a series element for the microwave circuit (FIG. 7), causing a frequency-dependent attenuation in the microwave frequency comb. In SCM, the stray capacitance associated with the circuit of the oscillator as well as fringing capacitance at the tip have such a large effect that the depletion capacitance is approximately one part per million of the total measured capacitance.

(4) The frequency-dependent attenuation in the profile of the microwave frequency comb may be determined at 100 or more harmonics to characterize the depletion layer as shown in FIGS. 8 and 9. While the SCM is operated at a single frequency, typically 915 MHz, when determining the dopant concentration or the depth of the depletion layer with the frequency comb, harmonics where FIGS. 8 and 9 illustrate that these properties have a steep dependence on the frequency are used. It is possible to quickly make measurements on a large number of harmonics so that the optimum frequency range is included. This feature is especially useful for measurements with samples that have a wide dynamic range for the dopant concentration such as p-n junctions. In three-dimensional dopant profiling, the objective is to determine the dopant concentration on a three-dimensional Cartesian grid of points within the semiconductor, whereas with the frequency comb, the measured values of dopant concentration are mean values on hemispherical surfaces corresponding to the outer surfaces of the depletion layers caused by the specific values used for the DC bias at each point in the scan of the surface. However, the values on the grid may be approximated from these data by numerical methods such as interpolation, or optimization by adjusting the values on the grid to minimize a cost function which is defined as the difference between the values predicted on the hemispheres and the measured values. Such techniques are well-known to those having skill in numerical analysis.

(5) The extremely narrow linewidth of each harmonic of the frequency comb makes it easier to measure these signals in the presence of noise because a smaller resolution bandwidth can be used to measure each harmonic.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for generating a microwave frequency comb comprising:
    a scanning tunneling microscope comprising:
    control electronics;
    a source for generating a bias voltage; and
    a tunneling junction having a chosen diameter, a DC current generated from said bias voltage, and a shunting capacitance, said tunneling junction being effective for producing optical rectification; and
    a mode-locked laser having a pulsed output having a mean photon energy focused onto said tunneling junction with a chosen repetition rate; whereby pulses having a chosen spacing are superimposed on the DC current of said tunneling junction such that the microwave frequency comb is produced having a fundamental frequency and harmonic frequencies at integer multiples of the pulse repetition rate of said laser, each harmonic having a linewidth.

2. The apparatus of claim 1, wherein said tunneling junction comprises a tip electrode and a sample electrode disposed a chosen distance therefrom.

3. The apparatus of claim 2, wherein said tip electrode is chosen from gold, tungsten, platinum, and iridium, and mixtures thereof.

4. The apparatus of claim 2, wherein said sample electrode is chosen from gold, tungsten, platinum, and iridium, and mixtures thereof.

5. The apparatus of claim 1, wherein the chosen diameter of said tunneling junction is ≤1 nm, whereby the shunting capacitance is reduced to obtain improved high frequency response of the microwave frequency comb.

6. The apparatus of claim 1, wherein said mode-locked laser is actively or passively stabilized.

7. The apparatus of claim 1, wherein said scanning tunneling microscope further comprises a bias-T for separating said microwave frequency comb from said control electronics and said source of bias voltage, and for coupling said microwave frequency comb from said sample and said tip.

8. The apparatus of claim 1, wherein the mean photon energy of the output of said mode-locked laser is between about 650 nm and approximately 1100 nm.

9. An apparatus for characterizing a semiconductor sample comprising:
    a scanning tunneling microscope comprising: control electronics; a source for generating a DC bias voltage; a tunneling junction having a chosen diameter, a DC current generated from said DC bias voltage, and a shunting capacitance, said tunneling junction being effective for producing optical rectification, said tunneling junction comprising a tip electrode and a semiconductor sample electrode having a surface disposed a chosen distance therefrom and a band gap energy; and
    a scanner for adjusting the chosen distance and for rastering said tunneling junction over the surface of said semiconductor electrode; and
    a mode-locked laser having a pulsed output having a chosen mean photon energy less than the band gap energy focused onto said tunneling junction with a chosen repetition rate; whereby pulses having a chosen spacing are superimposed on the DC current of said tunneling junction such that a microwave frequency comb is produced having a fundamental frequency and harmonic frequencies at integer multiples of the pulse repetition rate of said laser; and whereby the bias voltage creates a depletion region in said semiconductor sample causing thereby a frequency-dependent attenuation of said microwave frequency comb at each tunneling junction location, from which dopant concentration of the depletion region is determined.

10. The apparatus of claim 9, wherein said tip electrode is chosen from gold, tungsten, platinum, and iridium, and mixtures thereof.

11. The apparatus of claim 9, wherein the chosen diameter of said tunneling junction is 1 nm, whereby the shunting capacitance is reduced to obtain improved high frequency response of the microwave frequency comb.

12. The apparatus of claim 9, wherein said scanning tunneling microscope further comprises a bias-T for separating said microwave frequency comb from said control electronics and said source of DC bias voltage, and for coupling said microwave frequency comb from said sample and said tip.

* * * * *